(12) United States Patent
Ratte

(10) Patent No.: US 10,480,458 B2
(45) Date of Patent: Nov. 19, 2019

(54) DEVICE HAVING AN ACTIVATED CARBON CANISTER AND MOTOR VEHICLE HAVING SUCH A DEVICE

(71) Applicant: VOLKSWAGEN AKTIENGESELLSCHAFT, Wolfsburg (DE)

(72) Inventor: Thomas Ratte, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/543,753

(22) PCT Filed: Dec. 22, 2015

(86) PCT No.: PCT/EP2015/080935
§ 371 (c)(1),
(2) Date: Jul. 14, 2017

(87) PCT Pub. No.: WO2016/119980
PCT Pub. Date: Aug. 4, 2016

(65) Prior Publication Data
US 2018/0023519 A1 Jan. 25, 2018

(30) Foreign Application Priority Data
Jan. 27, 2015 (DE) .......... 10 2015 201 339

(51) Int. Cl.
*F02M 25/08* (2006.01)
*B60K 15/035* (2006.01)

(52) U.S. Cl.
CPC ....... *F02M 25/0854* (2013.01); *B60K 15/035* (2013.01); *F02M 25/089* (2013.01);
(Continued)

(58) Field of Classification Search
CPC ........ B01D 2253/102; B01D 2257/702; F02M 25/0854; F02M 25/0872; F02M 25/089
(Continued)

(56) References Cited

U.S. PATENT DOCUMENTS 3,730,158 A * 5/1973 St. Amand ......... F02M 25/0854
123/519
4,386,947 A * 6/1983 Mizuno ................. B01D 53/02
123/519
(Continued)

FOREIGN PATENT DOCUMENTS

CN 101155985 A 4/2008
CN 203362344 U 12/2013
(Continued)

OTHER PUBLICATIONS

Search Report for German Patent Application No. 10 2015 201 339.1; dated Apr. 27, 2015.
(Continued)

*Primary Examiner* — George C Jin
*Assistant Examiner* — Teuta B Holbrook
(74) *Attorney, Agent, or Firm* — Barnes & Thornburg LLP

(57) ABSTRACT

A device having activated carbon canisters. A fuel tank used to supply fuel is vented into the activated carbon canisters that have, as activated carbon filters, carbon granules having large surfaces for temporarily adsorbing the hydrocarbon gases contained in the fuel tank emissions. The regeneration occurs cyclically by backflushing where fresh air is sucked in through an outlet and conducted through the activated carbon canisters to lead the hydrocarbon gases back into the region of the combustion apparatus. The device has structurally identical activated carbon canisters arranged in the same plane and connected in series by connecting lines,
(Continued)

whereby an outlet opening of a first activated carbon canister is connected to an inlet opening of a further activated carbon canister. The outlet opening of the activated carbon canister is arranged above the inlet opening with respect to gravity.

20 Claims, 2 Drawing Sheets

(52) U.S. Cl.
CPC .... *F02M 25/0836* (2013.01); *F02M 25/0872* (2013.01); *B01D 2253/102* (2013.01); *B01D 2257/702* (2013.01); *B01D 2257/708* (2013.01)

(58) Field of Classification Search
USPC .................................................. 123/518, 519
See application file for complete search history.

(56) References Cited

U.S. PATENT DOCUMENTS

| | | | | |
|---|---|---|---|---|
| 5,139,668 | A * | 8/1992 | Pan | B01D 15/00 210/321.8 |
| 5,165,379 | A * | 11/1992 | Thompson | B60K 15/03504 123/516 |
| 5,456,237 | A * | 10/1995 | Yamazaki | F02M 25/0854 123/519 |
| 5,477,836 | A * | 12/1995 | Hyodo | F02M 25/0854 123/519 |
| 5,693,230 | A * | 12/1997 | Asher | B01D 53/22 210/263 |
| 5,697,348 | A * | 12/1997 | Schwager | F02M 25/0836 123/516 |
| 5,878,729 | A | 3/1999 | Covert et al. | |
| 5,916,531 | A * | 6/1999 | Pan | B01D 53/0446 210/304 |
| 6,390,073 | B1 | 5/2002 | Meiller et al. | |
| 6,458,185 | B1 * | 10/2002 | Reiter | B01D 53/04 95/115 |
| 6,964,695 | B2 * | 11/2005 | Place | B01D 53/0438 95/143 |
| 7,614,387 | B2 * | 11/2009 | Wang | B60K 15/03519 123/519 |
| 9,534,566 | B2 * | 1/2017 | Danielowski | B60K 15/03504 |
| 9,546,620 | B2 * | 1/2017 | Pearce | F02M 25/0836 |
| 2005/0022672 | A1 | 2/2005 | Loevenbruck et al. | |
| 2006/0180127 | A1 | 8/2006 | Hirano et al. | |
| 2007/0078056 | A1 | 4/2007 | Abe et al. | |
| 2008/0283127 | A1 * | 11/2008 | Wang | B60K 15/03519 137/313 |
| 2008/0302340 | A1 | 12/2008 | Defilippi | |
| 2009/0151706 | A1 * | 6/2009 | Makino | F02M 25/0854 123/519 |
| 2010/0293905 | A1 * | 11/2010 | Lin | F02M 25/089 55/325 |
| 2012/0186563 | A1 * | 7/2012 | Hasegawa | B01D 53/0415 123/519 |
| 2012/0204720 | A1 * | 8/2012 | Tschantz | B60K 15/03504 95/148 |
| 2014/0007963 | A1 | 1/2014 | Revink et al. | |
| 2014/0311442 | A1 * | 10/2014 | Leonard | F02M 35/08 123/198 R |
| 2015/0176540 | A1 * | 6/2015 | Danielowski | B60K 15/03504 123/519 |
| 2016/0129383 | A1 * | 5/2016 | Volk | B01D 46/0036 96/131 |
| 2017/0174072 | A1 * | 6/2017 | Van Schaftingen | B01D 53/72 |
| 2017/0184059 | A1 * | 6/2017 | Menke | F02M 25/0854 |

FOREIGN PATENT DOCUMENTS

| | | |
|---|---|---|
| DE | 102007056667 A1 | 5/2009 |
| DE | 102009020703 A1 | 11/2010 |
| DE | 102010006042 A1 | 8/2011 |
| DE | 102010026367 A1 | 1/2012 |
| DE | 102011009149 A1 | 7/2012 |
| DE | 102011004081 A1 | 8/2012 |
| EP | 0360428 A2 | 3/1990 |
| EP | 1726815 A2 | 11/2006 |
| JP | 2010179300 A | 8/2010 |
| WO | 2009042354 A1 | 4/2009 |

OTHER PUBLICATIONS

Search Report for International Patent Application No. PCT/EP2015/080935, dated May 6, 2016.

Search Report and Office Action for Chinese Patent Application No. 201580074729.6; dated Nov. 14, 2018.

* cited by examiner

DEVICE HAVING AN ACTIVATED CARBON CANISTER AND MOTOR VEHICLE HAVING SUCH A DEVICE

PRIORITY CLAIM

This patent application is a U.S. National Phase of International Patent Application No. PCT/EP2015/080935, filed 22 Dec. 2015, which claims priority to German Patent Application No. 10 2015 201 339.1, filed 27 Jan. 2015, the disclosures of which are incorporated herein by reference in their entirety.

SUMMARY

Illustrative embodiments relate to a device having an activated carbon canister accommodating an activated carbon filter and intended for a fuel tank of a motor vehicle. Illustrative embodiments also relate to a motor vehicle having a device that has an activated carbon canister of this kind.

BRIEF DESCRIPTION OF THE DRAWINGS

The disclosed embodiments are illustrated in the drawings and are described below. In the drawings, in each case in a basic diagram.

DETAILED DESCRIPTION OF THE DISCLOSED EMBODIMENTS

Figure 1:
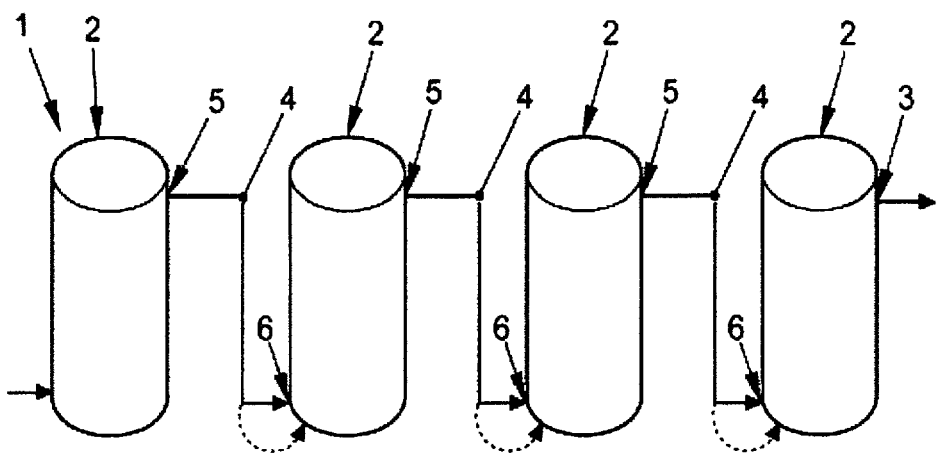
FIG. 1 shows a device having four activated carbon canisters of identical construction in an in-series arrangement.

Many instances of activated carbon filters for motor vehicles are already known from the prior art. They are typically used to filter gases which arise in the region of the fuel tank before they enter the environment. The intention is, by this means, to prevent unwanted emissions of hydrocarbons into the environment. The activated carbon filters are typically embodied in such a way that they filter the vapors which arise in the fuel tank when the internal combustion engine or some other combustion unit in the motor vehicle is not in operation and which cannot therefore be mixed in with the combustion gas.

The fuel contained in a fuel tank is exposed to warming of the environment, which increases the vapor pressure of the volatile hydrocarbon fuel. In the known arrangements, the fuel tank vapor, which comprises hydrocarbons of relatively low molecular weight, is vented to an activated carbon canister, which contains carbon granules with a large surface area as an activated carbon filter for temporary adsorption of the fuel tank emissions. In this context, activated carbon filters are understood to mean fuel vapor canisters which are packed with an adsorbent which adsorbs and stores the fuel vapors.

During the operation of the internal combustion engine or some other suitable combustion unit in the motor vehicle, the activated carbon filter is regenerated, for which purpose fresh air is drawn in through the atmospheric connection thereof, passed through the activated carbon filter and passed into the region of the combustion unit. The fuel vapors are thereby flushed into the inlet manifold of the internal combustion engine, thus enabling the hydrocarbons picked up from the activated carbon filter to be burnt in this way to avoid toxic emissions being discharged into the environment.

To an increasing extent, motor vehicles are being embodied as hybrid vehicles in very different designs. For example, "plug-in hybrid vehicles" operate principally with electric energy storage devices that are charged externally. Since the electric capacity of the electric energy storage devices is sufficient for many short journeys, the motor vehicle can be operated for a long period of time without using the internal combustion engine. During this time, there is no purging of the activated carbon filter.

DE 10 2009 020 703 A1 discloses an activated carbon filter for an internal combustion engine, in particular, for hybrid vehicles. To improve regeneration, a very complex system of chambers is used to perform heating of the gas flow used for regeneration and of the region filled with activated carbon in this way to enable reactivity to be increased accordingly and better adsorption of hydrocarbons to be achieved during regeneration by the fresh air flow used for regeneration. Here, the construction is complex and requires additional energy owing to the heating.

WO 2009/042354 A1 relates to a plug-in hybrid vehicle. When fuel vapor is to be removed from the collecting tank, microwave energy is introduced into the particles within the collecting canister to heat the adsorbing particles from the inside out, thus expelling adsorbed fuel vapor from the bed and driving it back into the cooler fuel tank. There, the expelled vapor condenses or is held under a low fuel tank pressure.

DE 10 2011 009 149 A1 relates to an activated carbon filter for a motor vehicle, in which provision is made for the activated carbon filter to have a switching device and at least two activated carbon elements. There is a serial flow through the two elements having the activated carbon during filtering, and a parallel flow during regeneration.

U.S. Pat. No. 5,878,729 A relates to a fuel vapor canister having a plurality of outlet openings and purge openings, which are regulated by respective valves. During the operation of the engine, the purge valves and the air inlet valves are opened to supply a vacuum from an air intake passage of the engine to the interior of the canister. As a result of supplying the vacuum, fuel vapor is purged from the fuel vapor canister to the inlet manifold of the engine.

Given this background, disclosed embodiments provide a device and a motor vehicle having an activated carbon canister of the type stated at the outset accommodating an activated carbon filter in such a way that the unwanted escape of hydrocarbons into the environment can thereby be restricted to a minimum. At the same time, it should be unnecessary to supply additional energy during operation and the design complexity should be kept low.

According to the disclosed embodiments, therefore, the device has a plurality of activated carbon canisters, each enclosing an activated carbon filter, wherein the activated carbon canisters are each connected serially in a series circuit by connecting lines in such a way that an outlet opening of a first activated carbon canister is in each case connected to an inlet opening of a further activated carbon canister, wherein the outlet opening is arranged below the inlet opening in the direction of the force of gravity, i.e., is geodetically below the inlet opening. The disclosed embodiments exploit the fact that the density of the gaseous constituents, that is to say of the hydrocarbons, is greater than the density of the ambient air, with the result that the cascade-type progression of the connection of the canisters makes it more difficult for hydrocarbons to escape. The increased pressure difference required to overcome the multiple difference in height is an effective means of preventing the escape of the gaseous constituents into the environment. At the same time, the disclosed embodiments manage without an additional supply of energy, that is to say without heating for the activated carbon canisters, and therefore the operation of the device is not associated with any increase in energy consumption.

The hydrocarbon gas flowing across from the fuel tank enters a first activated carbon canister through the inlet opening in a region close to the bottom. The outlet opening is situated close to the highest point of the activated carbon canister and is connected by the connecting lines to an inlet opening of a following activated carbon canister.

Optimized temporary storage of hydrocarbons can be achieved under the action of gravity without technically complex structures, using a plurality of relatively small standardized activated carbon canisters connected in series by means of the connecting line, e.g., a pipe or a hose. The hydrocarbon gases stored in the activated carbon canisters are heavier than air and therefore collect in the lowest regions of the system.

In connecting the activated carbon canisters, it is essential that the respective activated carbon canister is always charged in a flow direction from the bottom up, counter to the force of gravity.

Here, the line segment of the connecting line serves as a useful volume for temporary storage of the hydrocarbon vapors. For this purpose, the connecting line can also optionally be equipped with internal structuring or can be equipped as a spiral hose with an increased flow resistance.

In this case, it has already proven beneficial if at least one connecting line has a collecting point, which is arranged in a region of the connecting line below the inlet opening of the activated carbon canister. This further increases the height difference between the lowest point of the collecting point and the outlet opening of the activated carbon canister and thereby further improves protection from the unwanted escape of hydrocarbon gases. This increases the respective height difference to be overcome between the activated carbon canisters since the connecting line has a region below the bottom level of the activated carbon canister.

An embodiment of the disclosed device is also achieved by using a pipe bend to form the collecting point, ensuring that the relatively heavy hydrocarbon gases which collect in the lowest region of the collecting point seal the line cross section of the connecting line and thus prevent flow through the connecting line, e.g., flow of ambient air. For this purpose, the collecting point can also be designed in the manner of a flange siphon with a dip tube, thus excluding unwanted displacement of the hydrocarbon gases even in the event of air pressure fluctuations in the environment of the vehicle.

Here, the length of the connecting line corresponds at least to the height of the activated carbon canister or to the height difference between the inlet opening and the outlet opening.

Another disclosed embodiment, which is likewise promising, is also achieved by virtue of the fact that a plurality of activated carbon canisters has substantially corresponding volumes and is connected one to the other only by the respective connecting line. This makes it possible to arrange the various activated carbon canisters at any desired point, e.g., in the engine compartment of the motor vehicle, in this way to allow space-saving accommodation. At the same time, this design also allows modular construction, wherein additional activated carbon canisters can be added without problems.

It is furthermore beneficial if the outlet openings of a plurality of activated carbon canisters, in particular, all the activated carbon canisters, are arranged in a common horizontal plane, wherein protection from the unwanted escape of hydrocarbon gases is determined by the height difference between the inlet openings and the outlet openings.

Moreover, a suitable embodiment for practical use is one in which the inlet openings of a plurality of activated carbon canisters, in particular, all the activated carbon canisters, are arranged in a common horizontal plane, wherein the activated carbon canisters can be connected to form a modular unit by a common support, for example, in this way to facilitate assembly.

The activated carbon canisters can be embodied in such a way that they can be exchanged individually or expanded in a modular manner to allow simple assembly and disassembly, e.g., for servicing or repair purposes.

Moreover, it is also beneficial if the activated carbon canisters are of identical construction in this way to reduce production costs.

A disclosed embodiment which has already proven to be an expedient design in practice is one in which the diameter of the free line cross section of the connecting line is more than 8 mm, in particular, more than 10 mm.

Another, disclosed embodiment is also achieved by virtue of the fact that a plurality of activated carbon canisters is arranged one inside the other, in particular, concentrically one inside the other, wherein a central activated carbon canister has a circular basic shape and the activated carbon canister enclosing the central canister has a cylindrical basic shape, the basic shape having a cross-sectional area of a circular ring, wherein an annular gap separating the adjacent activated carbon canisters is embodied as a connecting line between the outlet opening of an activated carbon canister and the inlet opening of another activated carbon canister. Supply may take place first to the central activated carbon canister, and therefore the outlet opening of the outer activated carbon canister can have an outflow opening leading into the environment.

The outlet openings could each have a pipe stub connected to the connecting line. In the case of concentric arrangement of the activated carbon canisters, it is also possible, as an alternative, for the outlet opening to be embodied as an overflow opening, wherein the activated carbon canisters are enclosed gastightly by a housing.

According to the disclosed embodiments, this is also achieved by means of a motor vehicle having a device that has an activated carbon canister of this kind. Starting from the density of the gaseous constituents, that is to say of the hydrocarbons, which is higher than that of the ambient air, the escape of hydrocarbons is made more difficult by the necessity of overcoming a height difference several times counter to the force of gravity toward the outlet, thereby reducing the escape of the gaseous constituents into the environment in an effective manner. It is thereby possible to satisfy increasingly strict legal requirements, even for internal combustion engines that have poor regeneration characteristics, with a reasonable amount of installation space and a minimized energy consumption in the regeneration of the activated carbon filter. By virtue of the lower pressure loss during regeneration, it is furthermore possible to achieve a higher purge rate, i.e., a higher volume of purge gas, thus making it possible for the subsequent burning of the hydrocarbons expelled during regeneration to take place with a correspondingly high excess of oxygen and, as a result, the occurrence of only minimal emissions, if any, of unwanted substances.

FIG. 1 shows a device 1 having a plurality of activated carbon canisters 2, which each accommodate an activated carbon filter (not shown) and which are assigned to a fuel tank (likewise not shown). A fuel tank used for fuel supply is vented into the activated carbon canister 2, which contains carbon granules with a large surface area as an activated carbon filter for the temporary adsorption of the fuel tank emissions. Regeneration takes place cyclically by means of backflushing by drawing fresh air in through an outlet 3 and passing it through the activated carbon canisters 2 in this way to carry hydrocarbon gases, in particular, back into the region of the combustion unit. The hydrocarbon gases picked up from the activated carbon filter are thereby burnt in this way to avoid harmful emissions into the environment. For this purpose, the device 1 has a plurality of activated carbon canisters 2 of identical construction, which are arranged in the same plane and which are each connected in a series circuit by connecting lines 4, whereby an outlet opening 5 of a first activated carbon canister 2 is in each case connected to an inlet opening 6 of a further activated carbon canister 2. According to the disclosed embodiments, the outlet opening 5 of the activated carbon canister 2 is arranged above the inlet opening 6 in relation to the force of gravity, with the result that overflow into the subsequent activated carbon canister 2 and finally also escape through the outlet 3 into the environment is greatly slowed down in accordance with the higher density of the hydrocarbon gases. The multiple height difference between the inlet opening 6 and the outlet opening 5 thus prevents the escape of the gaseous constituents into the environment in an effective manner. The effect can be further optimized, for example, by the fact that the connecting line 4 is routed in a pipe bend below the bottom level of the activated carbon canister 2 and then forms a collecting point, as can be seen indicatively in dashes. At the same time, the disclosed embodiments manage, without a further supply of energy, that is to say without heating, and therefore no additional energy consumption is associated with the operation of the device 1.

Figure 2:
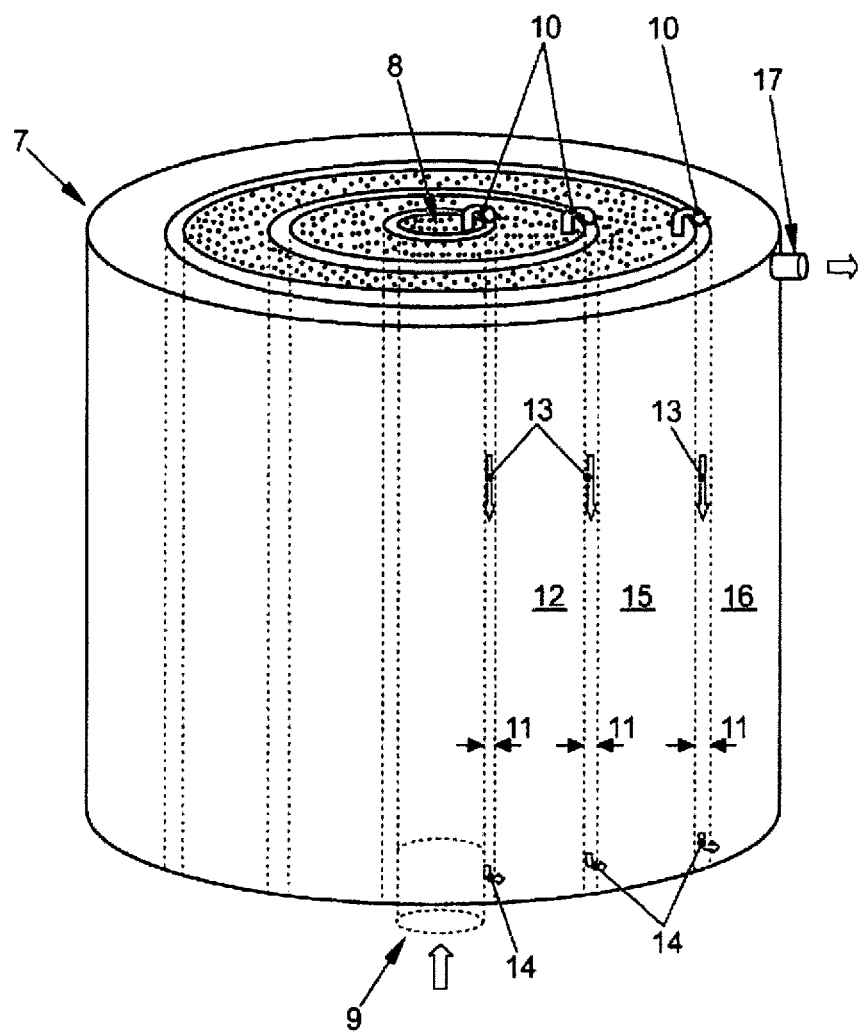
FIG. 2 shows another device having four concentrically arranged activated carbon canisters.

Another device 7 is described below with reference to FIG. 2, which shows a device 7 having a plurality of concentrically arranged activated carbon canisters 8, wherein illustration of a housing has been dispensed with for greater clarity. The hydrocarbons are first of all fed from the fuel tank to a central, cylindrical activated carbon canister 8 from below via an inlet 9. Within this activated carbon canister 8, the hydrocarbon gases flow upward and finally, through an outlet opening 10 indicated only by an arrow, into an annular gap 11 between the first activated carbon canister 8 and an annular activated carbon canister 12 enclosing the latter concentrically. Through this annular gap 11, the hydrocarbon gases flow downward in arrow direction 13 to an inlet opening 14, likewise illustrated indicatively by an arrow, of the next activated carbon canister 15, which is concentrically enclosed by a further activated carbon canister 16. An outlet 17 of the outer activated carbon canister 16 has an opening leading to the environment.

LIST OF REFERENCE SIGNS 1 device
2 activated carbon canister
3 outlet
4 connecting line
5 outlet opening
6 inlet opening
7 device
8 activated carbon canister
9 inlet
10 outlet opening
11 annular gap
12 activated carbon canister
13 arrow direction
14 inlet opening
15 activated carbon canister
16 activated carbon canister
17 outlet

The invention claimed is:

1. A device for temporary storage of gas containing hydrocarbons emitted by fuel in a fuel tank of a motor vehicle, wherein density of the gas containing hydrocarbons is greater than density of ambient air, the device comprising:
   a plurality of activated carbon canisters, each enclosing an activated carbon filter charged in a flow direction from bottom up to counter to the force of gravity; and
   connecting lines connected to the plurality of activated carbon canisters such that the plurality of activated carbon canisters are arranged in a cascade progression, wherein an outlet opening of a first activated carbon canister is, in each case, connected to an inlet opening of a further activated carbon canister,
   wherein, in each of the plurality of activated carbon canisters, the respective outlet opening is arranged higher than the inlet opening, and
   wherein an increased pressure difference required for the gas containing hydrocarbons to overcome height differences resulting from positioning of the inlets and outlets in the cascaded arrangement prevents escape of the gas containing hydrocarbons as a result of the relative density of the gas containing hydrocarbons in comparison to ambient air such that the device collects the gas containing hydrocarbons in lowest regions of the plurality of activated carbon canisters by the force of gravity.

2. The device of claim 1, wherein the connecting lines connecting the plurality of activated carbon canisters are spiral hoses with increased flow resistance.

3. The device of claim 2, wherein at least one of the collecting lines includes a pipe bend.

4. The device of claim 1, wherein the plurality of activated carbon canisters have substantially corresponding volumes.

5. The device of claim 1, wherein the outlet openings and/or the inlet openings of the plurality of activated carbon canisters are, in each case, arranged in a common horizontal plane.

6. The device of claim 1, wherein the plurality of activated carbon canisters are exchanged individually and/or expanded in modular fashion.

7. The device of claim 1, wherein the diameter of a free line cross section of the connecting lines is more than 8 mm.

8. The device of claim 1, wherein a subset of the plurality of activated carbon canisters are arranged one inside the other.

9. The device of claim 1, wherein the outlet opening is an overflow opening.

10. A motor vehicle having a device for temporary storage of gas containing hydrocarbons emitted by fuel in a fuel tank of the motor vehicle, wherein density of the gas containing hydrocarbons is greater than density of ambient air, the device comprising:

a plurality of activated carbon canisters, each enclosing an activated carbon filter charged in a flow direction from bottom up to counter to the force of gravity; and connecting lines connected to the plurality of activated carbon canisters such that the plurality of activated carbon canisters are arranged in a cascade progression, wherein an outlet opening of a first activated carbon canister is, in each case, connected to an inlet opening of a further activated carbon canister, wherein, in each of the plurality of activated carbon canisters, the respective outlet opening is arranged higher than the inlet opening, and wherein an increased pressure difference required for the gas containing hydrocarbons to overcome height differences resulting from positioning of the inlets and outlets in the cascaded arrangement prevents escape of the gas containing hydrocarbons as a result of the relative density of the gas containing hydrocarbons in comparison to ambient air such that the device collects the gas containing hydrocarbons in lowest regions of the plurality of activated carbon canisters by the force of gravity.

11. The device of claim 7, wherein the diameter of a free line cross section of the connecting lines is more than 10 mm.

12. The motor vehicle of claim 10, wherein the connecting lines connecting the plurality of activated carbon canisters are spiral hoses with increased flow resistance.

13. The motor vehicle of claim 12, wherein at least one of the connecting lines includes a pipe bend.

14. The motor vehicle of claim 10, wherein the plurality of activated carbon canisters have substantially corresponding volumes.

15. The motor vehicle of claim 10, wherein the outlet openings and/or the inlet openings of the plurality of activated carbon canisters are, in each case, arranged in a common horizontal plane.

16. The motor vehicle of claim 10, wherein the plurality of activated carbon canisters are exchanged individually and/or expanded in modular fashion.

17. The motor vehicle of claim 10, wherein the diameter of a free line cross section of the connecting lines is more than 8 mm.

18. The motor vehicle of claim 17, wherein the diameter of a free line cross section of the connecting lines is more than 10 mm.

19. The motor vehicle of claim 10, wherein a subset of the plurality of activated carbon canisters are arranged one inside the other.

20. The motor vehicle of claim 10, wherein the outlet opening is an overflow opening.

* * * * *